US008843608B2

(12) United States Patent
Li et al.

(10) Patent No.: US 8,843,608 B2
(45) Date of Patent: Sep. 23, 2014

(54) METHODS AND SYSTEMS FOR CACHING POPULAR NETWORK CONTENT

(75) Inventors: Qing Li, Cupertino, CA (US); Ronald Andrew Frederick, Mountain View, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 436 days.

(21) Appl. No.: 13/240,469

(22) Filed: Sep. 22, 2011

(65) Prior Publication Data
US 2013/0080611 A1 Mar. 28, 2013

(51) Int. Cl.
G06F 15/173 (2006.01)
G06F 15/16 (2006.01)
H04N 21/231 (2011.01)
H04L 29/08 (2006.01)
H04N 21/222 (2011.01)

(52) U.S. Cl.
CPC ....... *H04N 21/222* (2013.01); *H04N 21/23106* (2013.01); *H04L 67/2842* (2013.01)
USPC ............................ 709/223; 709/203; 709/217

(58) Field of Classification Search
USPC .................. 709/202–203, 217–219, 223–224
See application file for complete search history.

(56) References Cited

U.S. PATENT DOCUMENTS

| | | | |
|---|---|---|---|
| 6,611,876 B1 * | 8/2003 | Barrett et al. | 709/223 |
| 2008/0133696 A1 * | 6/2008 | Hanebeck | 709/217 |
| 2009/0106108 A1 * | 4/2009 | Ku | 705/14 |
| 2011/0173216 A1 * | 7/2011 | Newman et al. | 707/765 |
| 2011/0276396 A1 * | 11/2011 | Rathod | 709/203 |

* cited by examiner

*Primary Examiner* — Bharat N Barot
(74) *Attorney, Agent, or Firm* — Baker Botts L.L.P.

(57) ABSTRACT

In one embodiment, downloading one or more content items; determining which ones of the one or more content items are popular among a plurality of users; categorizing the one or more content items into one or more groups, wherein each group comprises one or more related content items; associating one or more keywords with each group, wherein the one or more keywords describe content of the one or more related content items in the corresponding group; and caching the one or more content items categorized into the one or more groups and the one or more keywords associated with each group.

42 Claims, 5 Drawing Sheets

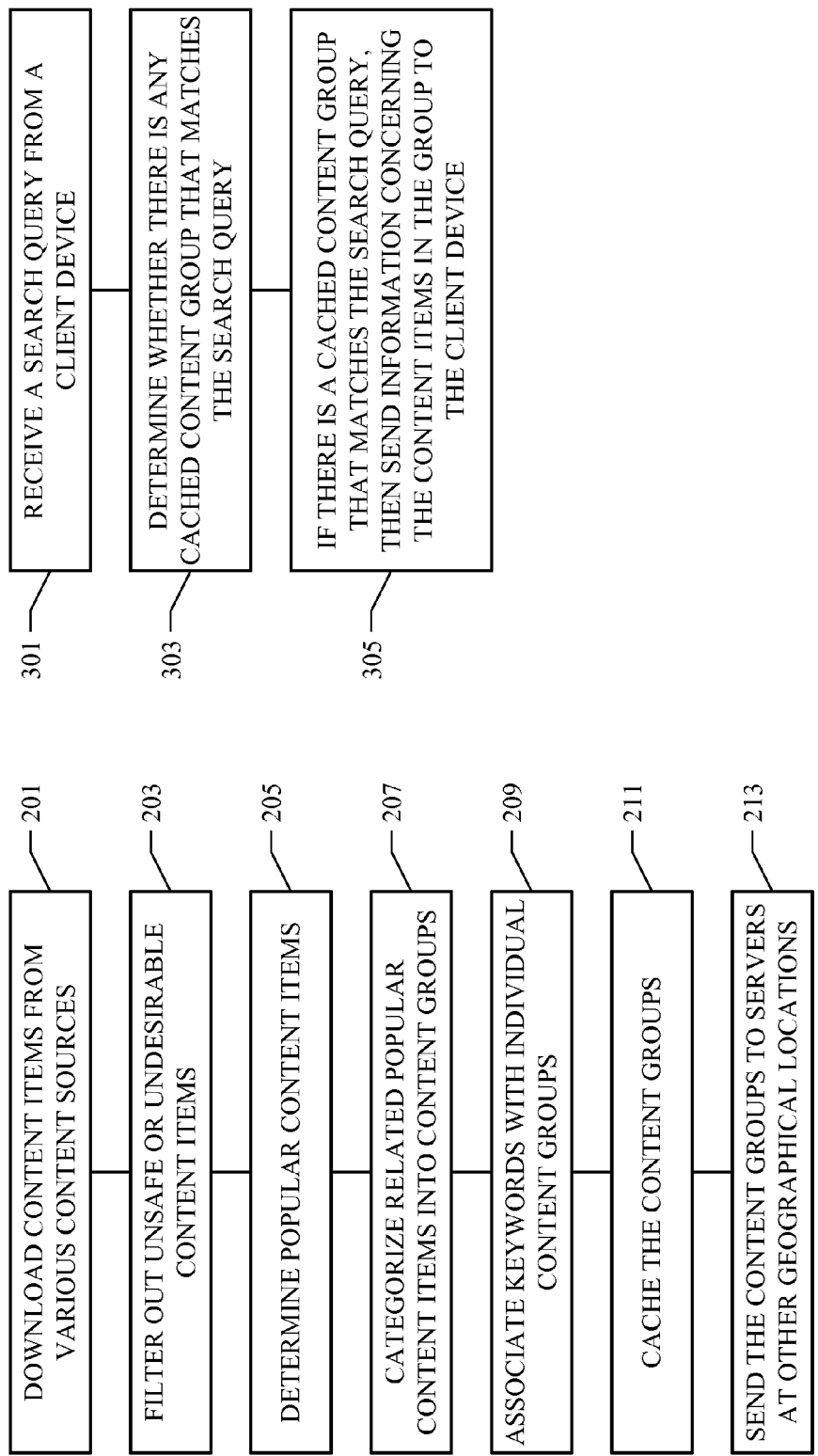

METHODS AND SYSTEMS FOR CACHING POPULAR NETWORK CONTENT

TECHNICAL FIELD

This disclosure generally relates to caching network content.

BACKGROUND

The Internet provides a vast amount of information. The individual pieces of information are often referred to as "network content" and may have various formats, such as, for example and without limitation, texts, audios, videos, images, web pages, documents, executables, web or news feeds, blog posts, etc. The content items are stored at many different sites, such as on computers and servers, in databases, etc., around the world. These different sites are communicatively linked to the Internet through various network infrastructures. Any person (e.g., network user) may access the publicly available network content via a suitable network device (e.g., a computer, a smart mobile telephone, etc.) connected to the Internet.

SUMMARY

This disclosure generally relates to caching network content.

In particular embodiments, downloading one or more content items; determining which ones of the one or more content items are popular among a plurality of users; categorizing the one or more content items into one or more groups, wherein each group comprises one or more related content items; associating one or more keywords with each group, wherein the one or more keywords describe content of the one or more related content items in the corresponding group; and caching the one or more content items categorized into the one or more groups and the one or more keywords associated with each group.

These and other features, aspects, and advantages of the disclosure are described in more detail below in the detailed description and in conjunction with the following figures.

BRIEF DESCRIPTION OF THE DRAWINGS

FIG. 2 illustrates an example method for caching and cataloging network content.

FIG. 3 illustrates an example method for selecting cached popular network content for presentation to users.

DESCRIPTION OF EXAMPLE EMBODIMENTS

Figure 1:
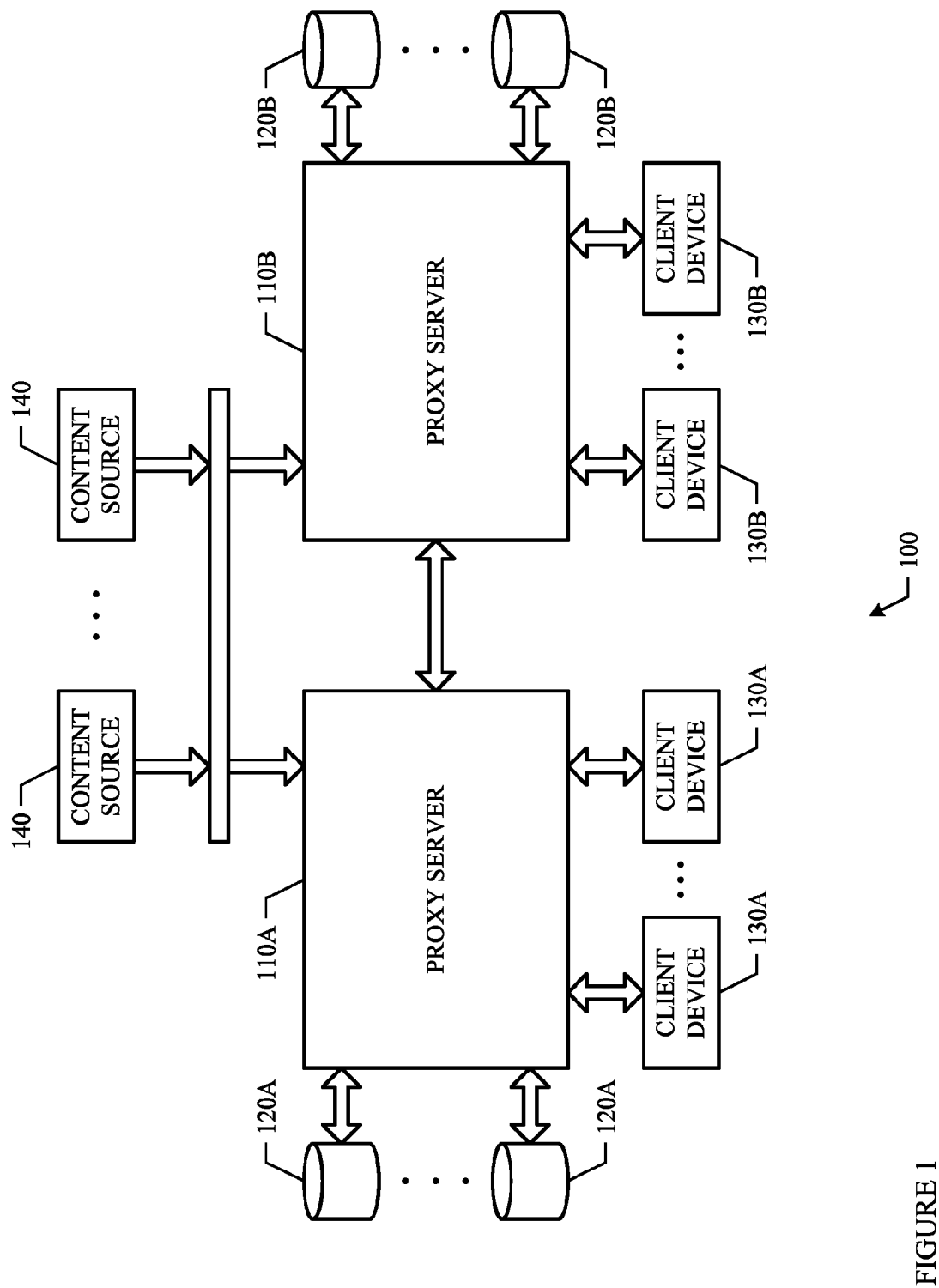
FIG. 1 illustrates an example system for managing popular network content.

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

There is a vast amount of information available on the Internet. Such information is often referred to as "network content", and each specific piece of information may be referred to as a "content item". Any network user may access the publicly available network content using a suitable network-ready device (e.g., a computer, a smart telephone, a game console, etc.).

During a particular time period, some content items may be more trendy or popular among the users than others. For example, in the hours and days immediately following the 2011 Tōhoku Earthquake in Japan, which occurred on 11 Mar. 2011, news stories, videos, blog posts, etc. about the earthquake were frequently accessed and viewed by many network users around the world. Similarly, in the hours and days following Michael Jackson's sudden death on 25 Jun. 2009, many network users searched for and viewed web pages, news feeds, images, videos, etc. about the celebrity artist and the circumstances surrounding his death.

Sometimes, when many users are attempting to access the same content item (e.g., a piece of breaking news) at the same time, there may be some delay due to the high-volume network traffic. A user may have to wait for a long time (e.g., some minutes) before the content item is downloaded and displayed on the client device used by that user. To prevent such delays, avoid content server overload or crashing, and improve network experiences for users in general, in particular embodiments, content items may be downloaded and cached by individual proxy servers. Given a specific proxy server, it may download content items from various content providers (e.g., other content servers) and cache these content items locally. It may determine which of the cached content items are more popular among the network users (e.g., by determining popularity ratings for the cached content items). The cached content items may be categorized, and similar content items of various formats may be grouped together into the same content group. The proxy server may proactively send some of the more popular content items to other proxy servers associated with this proxy server so that the other proxy servers may also cache these content items, which have been deemed popular by this proxy server.

FIG. 1 illustrates an example system 100 for managing popular network content. In particular embodiments, there may be any number of proxy servers 110. In general, in computer networks, a proxy server is a server (e.g., a computer system or an application) that acts as an intermediary for requests from clients seeking resources from other servers. It is usually situated between clients and servers. A client connects to the proxy server, requesting some service, such as a file, connection, web page, or other resource, available from a different server. The proxy server evaluates the request according to its filtering rules. For example, it may filter traffic by Internet Protocol (IP) address or protocol. If the request is validated by the filter, the proxy server provides the resource by connecting to the relevant server and requesting the service on behalf of the client. A proxy server may optionally alter the client's request or the server's response. Sometimes, it may serve a client's request without contacting the specified server. In this case, it has "cached" responses generated by the server from other clients' requests, and returns subsequent requests for the same content directly. In some implementations, proxy servers 110 may each be a ProxySG appliance developed by Blue Coat Systems Inc. of Sunnyvale, California. The Blue Coat ProxySG appliances support secure web gateway and WAN optimization features.

Each proxy server 110 may be coupled to any number of datastores 120 for storing cached network content. In particular embodiments, given a specific proxy server (e.g., proxy server 110A), proxy server 110A may cache content items received from various content sources 140 as a result of serving requests from client devices 130A. These cached content items may be stored locally in datastores 120A. In some cases, proxy server 110A may cache as many content items as possible (e.g., for as long as there is storage capacity in datastores 120A). It may determine a popularity rank for each cached content item, which indicates how popular the corresponding content item is among the network users. Proxy server 110A may proactively send those cached content items that have high popularity ranks (e.g., content items whose popularity ranks are above a threshold) to other proxy servers (e.g., proxy server 110B) to be cached by those other proxy servers (e.g., stored in datastores 120B). In some implementations, proxy server 110A may predict the popularity trend and send potentially popular content items (e.g., based on the predicted popular trend) to the other proxy servers to be cached by those other proxy servers.

Each proxy server 110 may serve any number of client devices 140. For example, proxy server 110A is coupled to datastores 120A and serves client devices 130A; and proxy server 110B is coupled to datastores 120B and serves client devices 130B. Note that a particular client device 130 may be served by one proxy server 110 at one time and by another, different proxy server 110 at another time.

In particular embodiments, specific proxy servers 110 may be physically located in different locations around the world. These different locations may belong to different time zones. Two proxy servers 110 may be communicatively linked (e.g., via the Internet or an intranet) to each other so that they may exchange data (e.g., content items) between them.

There may be any number of content sources 140, such as websites, databases, etc. Each content source 140 may supply any number of content items. A content item may have any format, such as, for example and without limitation, text, audio, video, executable, blog post, web page, document, web or news feed, etc. A proxy server 110 may be communicatively linked (e.g., via the Internet) to any number of specific content sources 140 in order to download specific content items from these content sources 140. Note that multiple proxy servers 110 may be communicatively linked to the same content source 140.

FIG. 2 illustrates an example method for caching and cataloging network content. Some of the steps illustrated in FIG. 2 are described in reference to some of the components illustrated in FIG. 1.

In particular embodiments, a proxy server (e.g., proxy server 110A or 110B) may serve a number of client devices (e.g., client devices 130A or 130B). When a specific client device sends a request to a content server (e.g., a content source 140) requesting for a specific content item, the request may go through the proxy server. The proxy server may check whether a copy of the requested content item has been cached locally with the proxy server. If so, the proxy server may send the cached content item to the client device. In this case, the client request is served by the proxy server, without having to actually contact the content server to obtain the requested content item from the content server. On the other hand, if the requested content item is not cached with the proxy server, the proxy server may forward the client request to the content server and obtain the requested content item on behalf of the client device. The content item is then sent to the client device by the proxy server. The proxy server may cache the requested content item locally so that if this same content item is requested again in the future, the proxy server can serve those subsequent requests itself.

In particular embodiments, as a result of serving requests from various client devices, a proxy server may download content items from various content sources (STEP 201). These content items may have different formats, such as, for example and without limitation, text, audio, video, executable, web page, blog post, web or news feed, etc.

In particular embodiments, the proxy server may filter out unsafe or undesirable content items (STEP 203). As an example, when a particular content item (e.g., a piece of breaking news) is accessed by a large number of users, multiple content sources may provide multiple copies of the same content item. The proxy server may de-duplicate the multiple copies of the same content item so that only one copy of a content item remains. As another example, sometimes, advertisement or pornographic material may be incorporated into a popular content item. The proxy server may remove the advertisement or other undesirable material from the content item so that only the main, relevant information remains. As a third example, criminals often take advantage of popular content items or subject matters to attempt to scam or defraud users. After the 2011 Tohoku Earthquake, there were many websites on the Internet asking for donations to various charity groups and organizations for earthquake relief funds. Not all of these websites were legitimate. In fact, many were sponsored by criminals attempting to scam users into giving them money or financial information (e.g., credit card numbers). A user searching for information relating to the earthquake may inadvertently fall prey to one of the illegitimate websites. The proxy server may reject content items from questionable or suspicious sources to safeguard the users against scams and other criminal activities. As a fourth example, sometimes, malware (e.g., virus, worm, adware, spyware, etc.) may be incorporated into a content item. Without adequate anti-malware protection, a user may inadvertently download the malware when the user accesses the content item. The proxy server may scan each downloaded content item for possible malware and reject infected content items.

In some implementations, the proxy server may use WebPulse, a cloud-based anti-malware product developed by Blue Coat Systems Inc. of Sunnyvale, Calif., to filter content items obtained from various content sources. In this case, the proxy server incorporates a security component to guard the users against unsafe or undesirable content items. Only those content items that are deemed safe and appropriate are cached locally by the proxy server. The unsafe or undesirable content items are rejected (e.g., deleted).

In particular embodiments, the proxy server may determine which downloaded content items are popular (e.g., among the network users) during a specific time period (STEP 205). Note that what is considered popular during one time period may differ from another time period. For example, shortly after 25 Jun. 2009, content items relating to Michael Jackson and his sudden death may be considered popular because a great number of users was searching for and accessing these content items. However, these same content items may not be considered popular six months or a year later because not many users were still interested in accessing these content items. Furthermore, some content items may be considered popular for time periods longer than other content items. Therefore, the proxy server may periodically (e.g., once per hour, per day, or per week) determine what the popular content items are during the current time period. In some implementations, the proxy server may determine the popular content items during the current hour, the current day, or the current week.

In particular embodiments, there may be a default time period for the proxy server. For example, the default time period may be one day. Thus, the proxy server may determine which content items are considered popular during each day. However, this default time period may be overridden (e.g., by a proxy administrator). For example, an administrator may change the time period to four hours, and as a result, the proxy server may determine which content items are considered popular during every four-hour period.

In some implementations, a content item is considered popular when it is accessed many times by many users during a specific time period. For example, the proxy server may compare the average access frequencies (e.g., number of user access per second or number of user access per minute) of individual content items. If the average access frequency of one particular content item is significantly higher than the average access frequencies of other content items during a specific time period, then that particular content item may be considered popular during that specific time period. Thus, since on 25 Jun. 2009, content items relating to Michael Jackson and his sudden death were accessed much more frequently than other content items, the proxy server may consider these content items popular during the day of 25 Jun. 2009. Alternatively, if the average access frequency of a particular content item is above a threshold, then that particular content item may be considered popular.

In some implementations, the proxy server may analyze search queries submitted by users to search engines. These search queries often include keywords that suggest what the popular subject matters searched by the users are during a specific time period. The content items relating to these popular subject matters may be considered popular during that specific time period. For example, since on 25 Jun. 2009, a great number of users has submitted search queries such as "Michael Jackson" or "Michael Jackson death" or "Michael Jackson dead", the proxy server may consider content items relating to the keywords "Michael Jackson" or "Michael Jackson death" popular during the day of 25 Jun. 2009. When deciding whether a particular subject matter searched by network users is popular, the proxy server may consider the number of search queries relating to the subject matter submitted by the user during a specific time period. If the number is above a threshold, the subject matter may be considered popular. Alternatively, if the number of search queries relating to the particular subject matter is significantly higher than the number of search queries relating to other subject matters, then the subject matter may be considered popular.

In some implementations, a content item may be considered popular if it is related to a trendy subject matter. For example, Apple's iPhone is a very fashionable product among many network users, especially younger users. Consequently, many users pay close attention to information relating to various aspects of the iPhone, such as when Apple shall release the next generation of the iPhone (e.g., iPhone 5). The proxy server may consider content items relating to the iPhone as popular. In some cases, a subject matter may remain fashionable or trendy for a relatively long time period (e.g., months or years). For example, Apple's iPhone became popular since its initial release and remains to be popular for years. Content items relating to such subject matter may be considered popular for time periods longer than other types of content items (e.g., content items relating to breaking news).

In particular embodiments, the proxy server may search for and locate popular content items among information posted on frequently accessed websites (e.g., content sources 140) on the Internet, such as "news.yahoo.com", "news.google.com", "news.bing.com", "www.cnn.com", "www.bbc.com", "www.msnbc.com", "www.nytimes.com", or "www.foxnews.com". In some implementations, the proxy server needs to be aware of the structure of a website before it can determine the subject matter of a content item and which content items are popular among the users, and extract those popular content items. The structure of a website indicates the relationships among the individual web pages of the website (e.g., which web page is linked to which other web pages), and the layout of the individual web pages (e.g., the components, such as frames, contained in each web page, the content items contained in each component, etc.). In some implementations, a number (e.g., 100) of the most frequently accessed and most credible websites on the Internet are selected. The structure of each of these website is manually determined. The structural information of each website is maintained and manually updated from time to time.

In particular embodiments, the proxy server may determine a popularity rank for each content item cached by the proxy server. The popularity rank of a content item indicates how popular the content item is among the network users during the current time period. The more popular the content item, the higher its popular rank.

In particular embodiments, the proxy server may analyze the content items provided by various content sources (e.g., content sources 140, such as websites, databases, feeds, posts, etc.) to predict which content items may become popular (e.g., among the network users) in the near future and download (i.e., pre-fetch) these potentially popular content items from the appropriate content sources proactively. For example, the proxy server may predict trends among the users (e.g., based on currently available information), such as social trend, cultural trend, fashion trend, product trend, etc. The proxy server may then predict which content items may become popular based on these trends and proactively download these content items, which may potentially become popular in the near future, from the appropriate content sources.

In some implementations, there may be a pre-selected list of content sources. This list may be configurable so that the content sources on the list may be updated as needed. Knowing the trend of a subject title, the proxy server may pre-fetch, from the content sources on the list, specific content items that match the trend. For example, the proxy server may download a twitter text for mobile devices, a well known blogger page for mobile devices, a video clip from CNBC (which is considered by many the authoritative source for business news), a web page from CNBC, a web page from CNN (which is considered by many internationally as the authoritative source for international news), and so on. These pre-fetched content items may be combined with those content items already stored in the cache. A list of content items may be created that include some of the content items that are considered popular as well as some of the pre-fetched content items that may become popular. The indices of these content items may be offered to the user so that the user can select a specific index to view the detailed content of the corresponding content item.

the content items and categorize the content items according to their content so that related content items are grouped into the same content group (STEP 207). There are different means to determine the subject matter or content of a particular content item, and this disclosure contemplates any applicable means. As an example, for a text content item, such as an article, a blog post, or a document, the proxy server may parse the text to locate keywords, either in the title or in the body, that describe the subject matter of the content item. A news story about the 2011 Tōhoku Earthquake may include keywords such as "earthquake", "Japan", "Tōhoku", and "tsunami". These keywords indicate the main content of the news story. As another example, for an audio or video content item, there may be tags or other metadata associated with the audio or video content item. In addition, when an audio or video content item is included in a web page, there may be text near the content item, also included in the web page, that describes the subject matter or content of the content item. The proxy server may parse the metadata or the text associated with the content item to locate and extract keywords that describe the subject matter or content of the content item. In some implementations, when doing so, the proxy server may rely on the known layout of the web page, if the layout of the web page has been manually determined and maintained. For example, if it is known that in a particular web page that includes several video clips arranged in a row, a brief summary of the content of each video clip is included below the corresponding video clip, then the proxy server may parse each summary to locate and extract keywords for the corresponding video clip.

Content items relating to the same subject matter may be grouped together into the same content group. For example, shortly after the 2011 Tōhoku Earthquake, there were many content items, such as news stories, feeds, posts, video clips, etc., relating to the earthquake. These content items of various formats may be grouped together into the same content group.

In particular embodiments, keywords are associated with each content group (STEP 209). Any number of keywords may be associated with a particular content group. The keywords describe the subject matter or content of the content items in the group. For example, for the group that includes content items relating to the 2011 Tōhoku Earthquake, the keywords may include "earthquake", "Japan", "Tōhoku", and "tsunami". In some implementations, the keywords associated with a content group may reflect the keywords that describe the individual content items included in the group. The keywords may provide indexing information for the content groups as well as the individual content items included in each group.

In particular embodiments, the proxy server caches the content groups (STEP 211). The content items in each group as well as the keywords associated with that group may be stored. For example, proxy server 110A may cache content groups, together with their associated keywords, it has obtained and processed in datastores 120A; and proxy server 110B may cache content groups, together with their associated keywords, it has obtained and processed in datastores 120B.

In particular embodiments, there may be multiple proxy servers located at different geographical locations around the world. These locations may belong to different time zones. For example, proxy server 110A may be located in New York, while proxy server 110B may be located in San Francisco. Thus, proxy server 110A is located in a time zone (i.e., Eastern Time Zone) that is three hours ahead of the time zone (i.e., Pacific Time Zone) in which proxy server 110B is located. Proxy server 110A may serve mainly users on the East Coast, while proxy server 110B may serve mainly users on the West Coast.

Sometimes, when there is a significant event occurring over night or early in the morning, users on the East Coast may learn of the event before users on the West Coast because the users on the East Coast usually wake up and begin their days a few hours before the users on the West Coast. As the users on the East Coast learn of the event, they are likely to search for and access content items on the Internet relating to the event. These content items thus become popular due to the large number of user accesses they receive. Consequently, proxy server 110A may download, filter, categorize, index, and cache these content items relating to the event.

Moreover, proxy server 110A may also send the cached content items, including their group affiliations and associated keywords, to proxy server 110B to be cached with proxy server 110B as well. In other words, a proxy server may send popular content items it has downloaded, filtered, categorized, and indexed to other proxy servers (STEP 213) so that the other proxy servers may also cache these content items. In the example with proxy servers 110A and 110B, proxy server 110B receives the popular content items from proxy server 110A and caches these content items locally (e.g., in datastores 120B). By the time the users on the West Coast wake up and being their days, the popular content items are cached and ready to be accessed by the users.

FIG. 3 illustrates an example method for selecting cached popular network content for presentation to users. In particular embodiments, a user may submit a search query through a client device (STEP 301). Upon receiving the search query, the proxy server may first determine whether there is any cached content group that matches the search query (STEP 303). The proxy server may compare the search query against the keywords associated with each cached content group. If a match is found (i.e., if a cached content group matches the search query), information concerning the content items from that group may be sent to the client device to be presented to the user (STEP 305). In some implementations, a list of brief descriptions of the matching content items may be sent to the client device. In some implementations, a list of clickable links may be sent to the client device, where each link corresponds to one matching content item. A user may select any specific content item's description or link, which causes the proxy server to send that selected content item to the client device so that the user may view the actual content of the selected content item. On the other hand, if no match is found, the proxy server may forward the search query to a search engine so that the search engine can conduct a general search on the Internet for content items matching the search query.

A search engine is a computer-implemented tool designed to search for information relevant to specific subject matters or topics on a network, such as the Internet, the World Wide Web, or an intranet. To conduct a search, a network user may submit a search query to the search engine. The search query generally contains one or more words that describe a subject matter. In response, the search engine may identify one or more content items available on the network that are likely to be related to the search query, which may be referred to as "search results". The search engine may organize the search results and present them to the user. Often, each search result is presented in the form of a clickable link. A user may click on a specific link to access the actual content of the corresponding search result (i.e., content item).

FIG. 3 illustrates one example of how the cached content items may be used to improve a user's network experience. In this case, since the content items are cached locally with the proxy server, if any cached content item matches the search query, that content item may be retrieved from the cache and sent to the user's client device faster than searching and retrieving the same content item on the Internet, especially if a great number of users is attempting to access that content item on the Internet at the same time.

Alternative, in some embodiments, when a user submits a search query, a search engine may identify a list of search results (i.e., content items) and present them to the user on the user's client device. Suppose that the user clicks on a link to view the content of a corresponding search result. If the search result can be retrieved from its original source on the Internet and presented to the user on the client device quickly (e.g., within a threshold time period such as a few seconds), then nothing needs to be done by the proxy server. On the other hand, if there is a delay (e.g., longer than a threshold time period such as 30 seconds or a minute) in retrieving the search result from its original source on the Internet and a copy of the search result has been cached with the proxy server, the proxy server may step in, retrieve the cached copy of the search result, and send it to the user's client device to be presented to the user. Alternatively, even if a copy of the specific search result requested by the user has not been cached by the proxy server, if the proxy server has cached other content items that are similar as or related to the specific search result requested by the user, the proxy server may still suggest these other cached related content items to the user. The user may view some of these cached related content items while waiting for the search result to be downloaded from the Internet.

In some embodiments, while a user is viewing a content item, either cached by a proxy server or downloaded from the Internet, the proxy server may suggest other related content items, cached by the proxy server, to the user. When the proxy server downloads content items for caching, the proxy server may categorize them so that related content items are grouped together into the same content group. Keywords describing the subject matter of the content items in a group are associated with the group. Subsequently, while a user is viewing one content item, if there is a cached content group relating to that content item, the proxy server may suggest other content items from the cached group as related content items to the user. The user is given the option to select and view any related content item. The user may also ask for additional related content items.

Given a group of related content items that has been cached by a proxy server, in particular embodiments, the content items may be ranked based on their respective degrees of popularity. The more times a content item is accessed by users, the more popular it is. When suggesting related content items to a user, the content items in a group may be suggested according to their respective popularity ranks so that the more popular content items are suggested to the user before the less popular content items.

A group of related content items may have different formats. For example, some may be texts and others may be audio or video clips. Consequently, different content items may have different amounts of data (e.g., different numbers of bits). When suggesting and sending several related content items to a client device for presentation to a user, in particular embodiments, a proxy server may take into consideration the type and capabilities of the client device used by the user, such as its processor speed, memory size, network connection bandwidth, etc. For example, if the client device is a desktop computer having a wired network connection (e.g., an Ethernet connection), where the connection has a relatively high bandwidth, the proxy server may suggest and send content items (e.g., audio or video clips) that have relatively large amounts of data to the client device. Since the client device has a relatively fast network connection, the content items may be downloaded to the client device within a relatively short time (e.g., less than a minute). On the other hand, if the client device is a mobile telephone having a wireless network connection, where the connection has a relatively low bandwidth, the proxy server may suggest and send content items (e.g., texts) that have relatively small amounts of data to the client device first. This way, the user is able to view some content items right away and does not have to wait long for the content items to be downloaded to the client device. If the user chooses to (e.g., the user asks for more related content items), the proxy server can still suggest and send additional content items (e.g., audio or video clips) that have relatively large amounts of data to the client device.

In addition, when the proxy server downloads content items for caching, the proxy server may filter out unsafe or undesirable content items. Consequently, any cached content item presented to the user is guaranteed to be legitimate, safe, and free of malware.

Figure 4:
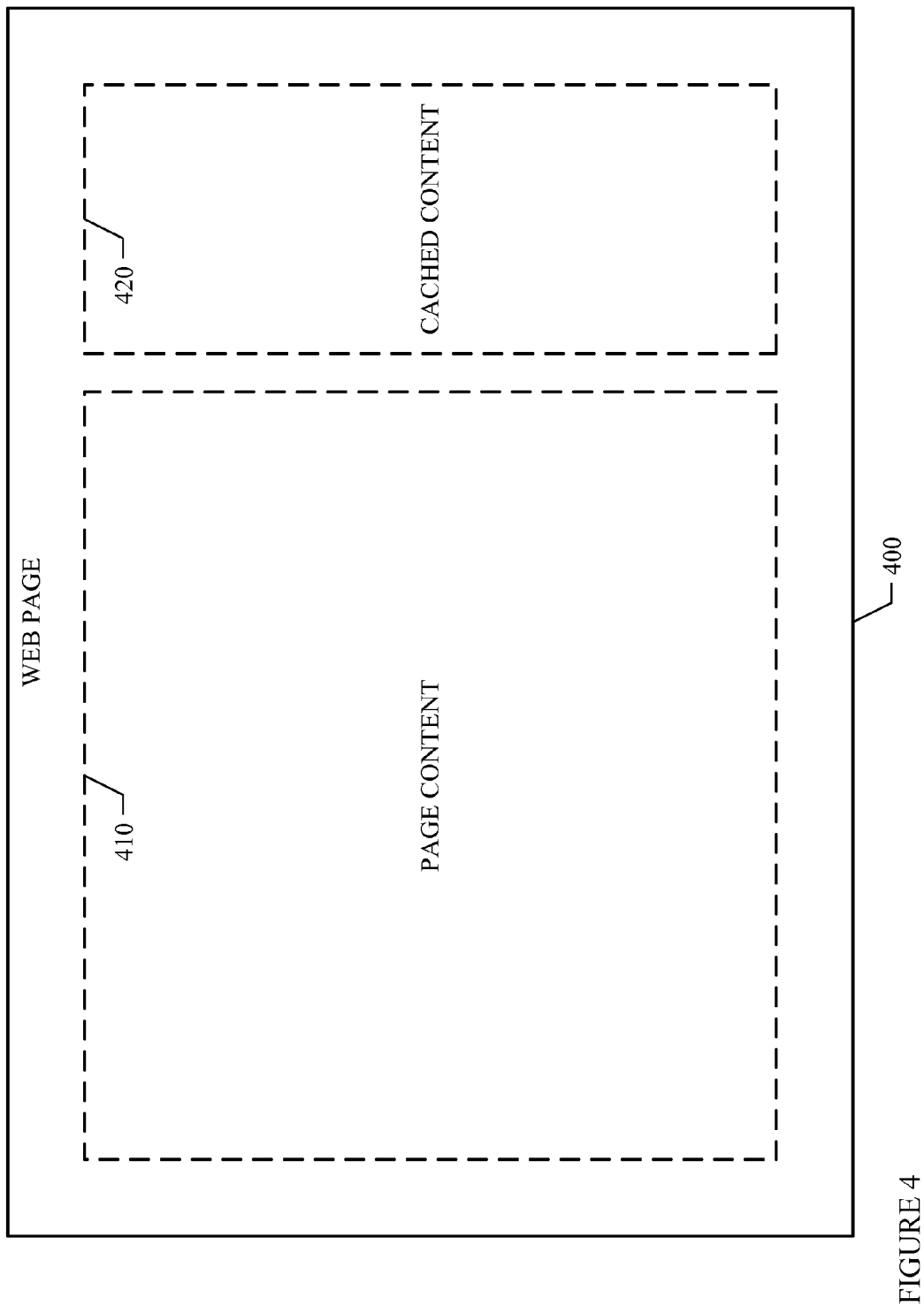
FIG. 4 illustrates an example web page that includes popular network content.

In some embodiments, a proxy server may serve a group of users via their respective client devices. When a user accesses a web page (e.g., the user's home page), the proxy server may incorporate cached content items that are considered popular during the current time period in the web page for presentation to the user. FIG. 4 illustrates an example web page 400 that includes popular network content. In this case, web page 400 is divided into two portions. Portion 410 includes the regular content of web page 400. Portion 420 is reserved for the cached content. A number of the most popular subject matters (e.g., the top 10 most popular subject matters) during the current time period may be listed in portion 420. Each subject matter may correspond to a cached content group and be described by some keywords and associated with a clickable link. The user may click on a link to access and view cached content items in the corresponding group, which relate to the corresponding subject matter.

Figure 5:
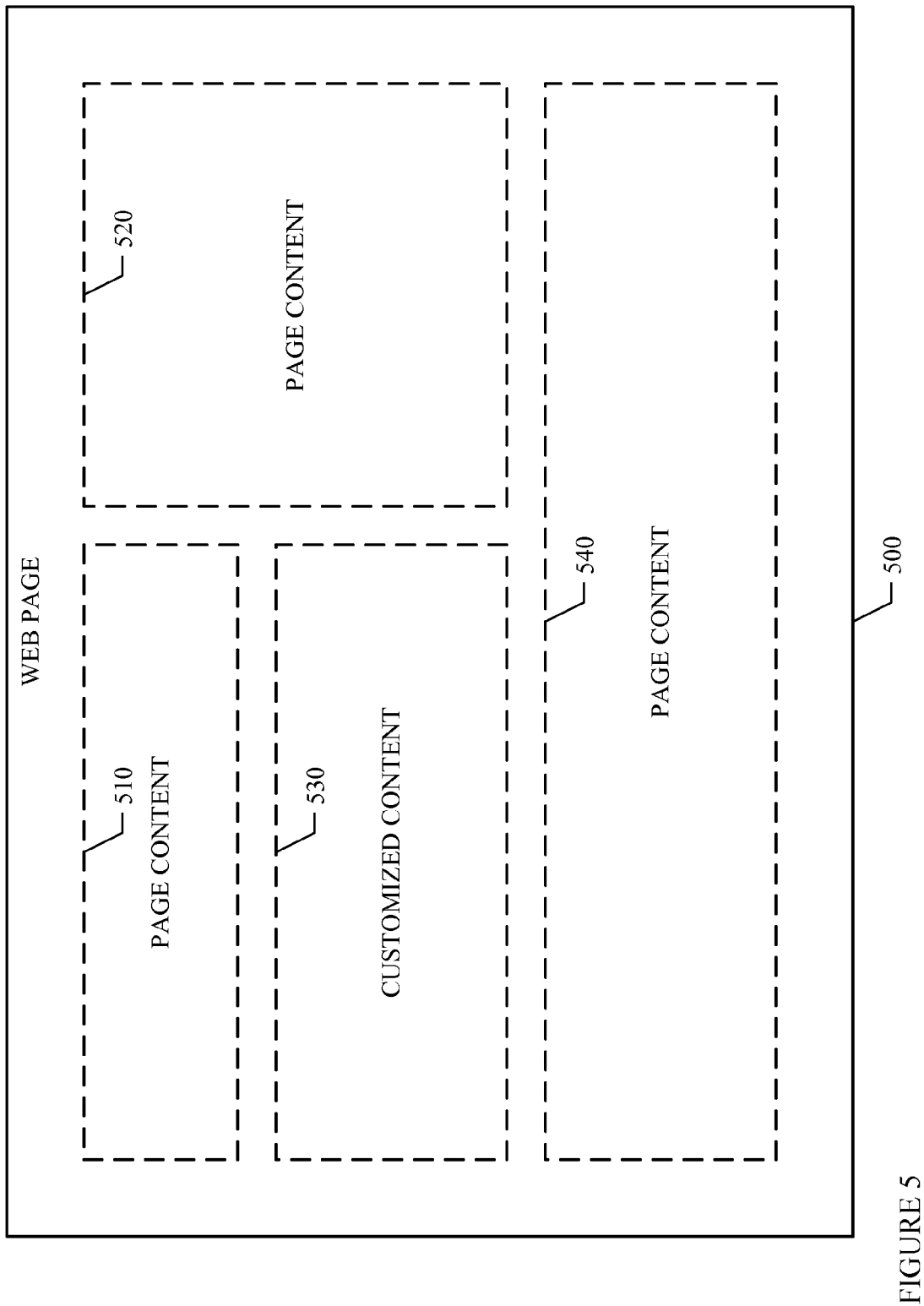
FIG. 5 illustrates an example web page that incorporates popular network content.

Sometimes, a web page may include a number of components (e.g., frames), and each component may include some specific content. The cached content items may be incorporated in a particular component of a web page. FIG. 5 illustrates an example web page 500 that incorporates popular content items cached by a proxy server. In this case, web page 500 includes four frames 510, 520, 530, 540, and each frame includes some content. Fames 510, 520, and 540 each include the regular content of web page 500. However, frame 530 is customized to include some content items cached by the proxy server.

For example, a proxy server may serve a group of users who are employees of a company. When a particular employee served by the proxy server accesses his/her home page, the proxy server may include content items made popular by other employees (e.g., the other employees have accessed those content items many times) in the home page. The employee now has a chance to view those content items that his/her colleagues consider important or interesting.

Figure 6:
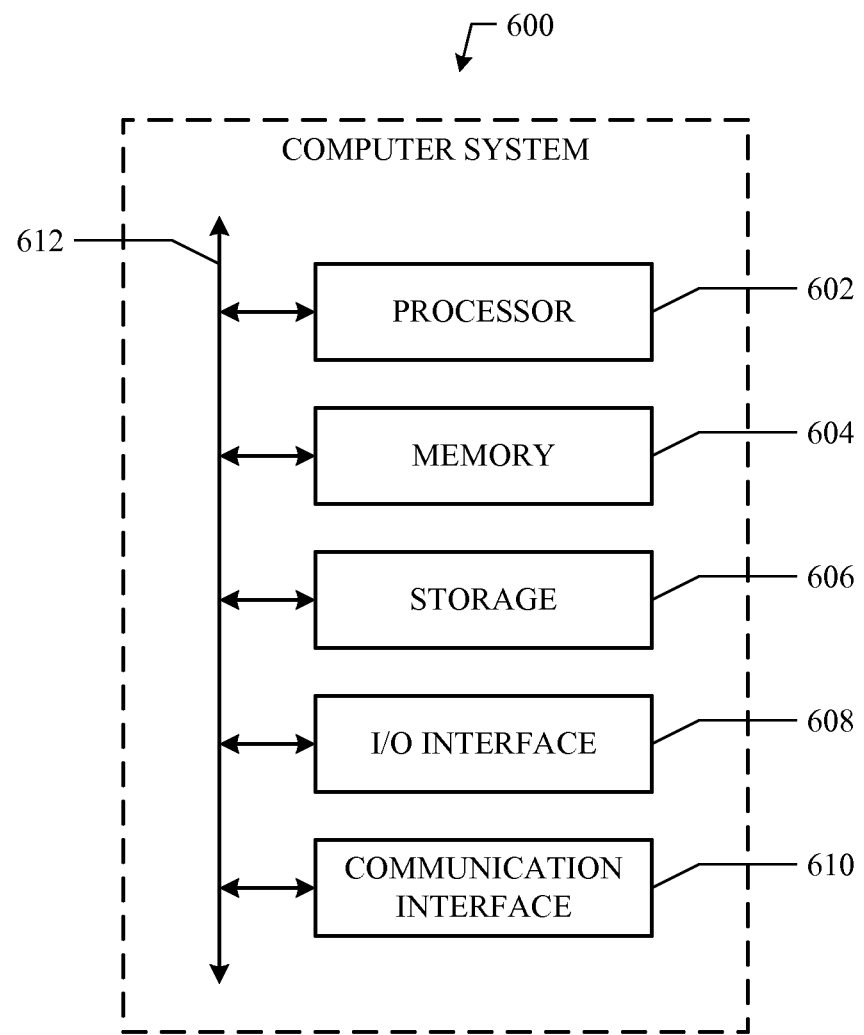
FIG. 6 illustrates an example computer system.

Particular embodiments may be implemented on one or more computer systems. FIG. 6 illustrates an example computer system 600, which may implement a proxy server (e.g., proxy servers 110A and 110B). In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    downloading, at one or more first computing devices, one or more content items;
    determining, at the one or more first computing devices, a specific time period over which to measure popularity;
    determining, at the one or more first computing devices, which ones of the one or more content items are popular among a plurality of users during the specific time period;
    categorizing, at the one or more first computing devices, the one or more content items into one or more groups, wherein each group comprises one or more related content items;
    associating, at the one or more first computing devices, one or more keywords with each group, wherein the one or more keywords describe content of the one or more related content items in the corresponding group; and
    caching, at the one or more first computing devices, the one or more content items categorized into the one or more groups and the one or more keywords associated with each group.

2. The method of claim 1, further comprising filtering the one or more content items to delete any unsafe or undesirable content item.

3. The method of claim 1, wherein determining which ones of the one or more content items are popular among the plurality of users comprises determining a popularity rank for each of the one or more content items.

4. The method of claim 1, further comprising sending at least one of the one or more content items that is popular among the plurality of users to one or more second computing devices to be cached by the one or more second computing devices.

5. The method of claim 4, wherein:
    the one or more first computing devices are located in a first time zone;
    the one or more second computing devices are located in a second time zone; and
    the second time zone is behind the first time zone.

6. The method of claim 1, further comprising:
    receiving a search query from a third computing device associated with a user;
    determining whether any group matches the search query by comparing the one or more keywords associated with each group with the search query; and
    if a group matches the search query, then sending at least one content item in the group to the third computing device to be presented to the user in response to the search query.

7. The method of claim 1, further comprising:
    receiving an indication that a user is using a third computing device to access a content item supplied by a fourth computing device; and
    if the content item is not downloaded from the fourth computing device to the third computing device within a predefined time period and one of the one or more cached content items is the same as the content item supplied by the fourth computing device, then sending the one cached content item to the third computing device.

8. The method of claim 1, further comprising:
    receiving an indication that a user is using a third computing device to access a content item supplied by a fourth computing device; and
    if the content item is not downloaded from the fourth computing device to the third computing device within a predefined time period and at least one of the one or more cached content items is related to the content item supplied by the fourth computing device, then sending a suggestion to the third computing device suggesting the at least one cached content item to the user.

9. The method of claim 1, further comprising:
    receiving a request for a web page from a third computing device associated with a user;
    selecting at least one of the one or more content items;
    incorporating the at least one content item in the web page; and
    sending the web page to the third computing device to be presented to the user.

10. The method of claim 1, further comprising:
    receiving an indication that a user is using a third computing device to view a content item;
    selecting from the one or more content items at least one content item that is related to the content item being viewed by the user; and
    sending a suggestion to the third computing device suggesting the at least one content item to the user.

11. The method of claim 10, wherein the at least one content item and the content item being viewed by the user belong to the same group.

12. The method of claim 10, wherein the at least one content item is selected based in part on the third computing device.

13. The method of claim 12, wherein selecting the at least one content item based in part on the third computing device comprises:
    determining a network connection of the third computing device;
    determining one or more hardware components of the third computing device; and
    selecting the at least one content item, wherein each of the at least one content item has a format that is suitable for the network connection of the third computing device and the one or more hardware components of the third computing device.

14. The method of claim 1, further comprising:
    analyzing content items provided by one or more fourth computing devices;
    predicting one or more potentially popular content items among the content items provided by the one or more fourth computing devices;
    downloading the one or more potentially popular content items from the one or more fourth computing devices; and
    caching the one or more potentially popular content items.

15. A first system comprising:
a memory comprising instructions executable by one or more processors; and
the one or more processors coupled to the memory and operable to execute the instructions, the one or more processors being operable when executing the instructions to:
  download one or more content items;
  determine a specific time period over which to measure popularity;
  determine which ones of the one or more content items are popular among a plurality of users during the specific time period;
  categorize the one or more content items into one or more groups, wherein each group comprises one or more related content items;
  associate one or more keywords with each group, wherein the one or more keywords describe content of the one or more related content items in the corresponding group; and
  cache the one or more content items categorized into the one or more groups and the one or more keywords associated with each group.

16. The first system of claim 15, wherein the one or more processors are further operable when executing the instructions to filter the one or more content items to delete any unsafe or undesirable content item.

17. The first system of claim 15, wherein determining which ones of the one or more content items are popular among the plurality of users comprises determine a popularity rank for each of the one or more content items.

18. The first system of claim 15, wherein the one or more processors are further operable when executing the instructions to send at least one of the one or more content items that is popular among the plurality of users to one or more second systems to be cached by the one or more second systems.

19. The first system of claim 18, wherein:
  the first system is located in a first time zone;
  the one or more second systems are located in a second time zone; and
  the second time zone is behind the first time zone.

20. The first system of claim 15, wherein the one or more processors are further operable when executing the instructions to:
  receive a search query from a third system associated with a user;
  determine whether any group matches the search query by comparing the one or more keywords associated with each group with the search query; and
  if a group matches the search query, then send at least one content item in the group to the third system to be presented to the user in response to the search query.

21. The first system of claim 15, wherein the one or more processors are further operable when executing the instructions to:
  receive an indication that a user is using a third system to access a content item supplied by a fourth system; and
  if the content item is not downloaded from the fourth system to the third system within a predefined time period and one of the one or more cached content items is the same as the content item supplied by the fourth system, then send the one cached content item to the third system.

22. The first system of claim 15, wherein the one or more processors are further operable when executing the instructions to:
  receive an indication that a user is using a third system to access a content item supplied by a fourth system; and
  if the content item is not downloaded from the fourth system to the third system within a predefined time period and at least one of the one or more cached content items is related to the content item supplied by the fourth system, then send a suggestion to the third system suggesting the at least one cached content item to the user.

23. The first system of claim 15, wherein the one or more processors are further operable when executing the instructions to:
  receive a request for a web page from a third system associated with a user;
  select at least one of the one or more content items;
  incorporate the at least one content item in the web page; and
  send the web page to the third system to be presented to the user.

24. The first system of claim 15, wherein the one or more processors are further operable when executing the instructions to:
  receive an indication that a user is using a third system to view a content item;
  select from the one or more content items at least one content item that is related to the content item being viewed by the user; and
  send a suggestion to the third system suggesting the at least one content item to the user.

25. The first system of claim 24, wherein the at least one content item and the content item being viewed by the user belong to the same group.

26. The first system of claim 24, wherein the at least one content item is selected based in part on the third system.

27. The first system of claim 26, wherein selecting the at least one content item based in part on the third computing device comprises:
  determine a network connection of the third system;
  determine one or more hardware components of the third system; and
  select the at least one content item, wherein each of the at least one content item has a format that is suitable for the network connection of the third system and the one or more hardware components of the third system.

28. The first system of claim 15, wherein the one or more processors are further operable when executing the instructions to:
  analyze content items provided by one or more fourth system;
  predict one or more potentially popular content items among the content items provided by the one or more fourth system;
  download the one or more potentially popular content items from the one or more fourth system; and
  cache the one or more potentially popular content items.

29. One or more computer-readable non-transitory storage media embodying software operable when executed by one or more first computer systems to:
  download one or more content items;
  determine a specific time period over which to measure popularity;
  determine which ones of the one or more content items are popular among a plurality of users during the specific time period;
  categorize the one or more content items into one or more groups, wherein each group comprises one or more related content items;
  associate one or more keywords with each group, wherein the one or more keywords describe content of the one or more related content items in the corresponding group; and cache the one or more content items categorized into the one or more groups and the one or more keywords associated with each group.

30. The media of claim 29, wherein the software is further operable when executed by the one or more first computer systems to filter the one or more content items to delete any unsafe or undesirable content item.

31. The media of claim 29, wherein determining which ones of the one or more content items are popular among the plurality of users comprises determine a popularity rank for each of the one or more content items.

32. The media of claim 29, wherein the software is further operable when executed by the one or more first computer systems to send at least one of the one or more content items that is popular among the plurality of users to one or more second computer systems to be cached by the one or more second computer systems.

33. The media of claim 32, wherein:
the one or more first computer systems are located in a first time zone;
the one or more second computer systems are located in a second time zone; and
the second time zone is behind the first time zone.

34. The media of claim 29, wherein the software is further operable when executed by the one or more first computer systems to:
receive a search query from a third computer system associated with a user;
determine whether any group matches the search query by comparing the one or more keywords associated with each group with the search query; and
if a group matches the search query, then send at least one content item in the group to the third computer system to be presented to the user in response to the search query.

35. The media of claim 29, wherein the software is further operable when executed by the one or more first computer systems to:
receive an indication that a user is using a third computer system to access a content item supplied by a fourth computer system; and
if the content item is not downloaded from the fourth computer system to the third computer system within a predefined time period and one of the one or more cached content items is the same as the content item supplied by the fourth computer system, then send the one cached content item to the third computer system.

36. The media of claim 29, wherein the software is further operable when executed by the one or more first computer systems to:
receive an indication that a user is using a third computer system to access a content item supplied by a fourth computer system; and
if the content item is not downloaded from the fourth computer system to the third computer system within a predefined time period and at least one of the one or more cached content items is related to the content item supplied by the fourth computer system, then send a suggestion to the third computer system suggesting the at least one cached content item to the user.

37. The media of claim 29, wherein the software is further operable when executed by the one or more first computer systems to:
receive a request for a web page from a third computer system associated with a user;
select at least one of the one or more content items;
incorporate the at least one content item in the web page; and
send the web page to the third computer system to be presented to the user.

38. The media of claim 29, wherein the software is further operable when executed by the one or more first computer systems to:
receive an indication that a user is using a third computer system to view a content item;
select from the one or more content items at least one content item that is related to the content item being viewed by the user; and
send a suggestion to the third computer system suggesting the at least one content item to the user.

39. The media of claim 38, wherein the at least one content item and the content item being viewed by the user belong to the same group.

40. The media of claim 38, wherein the at least one content item is selected based in part on the third computer system.

41. The media of claim 40, wherein selecting the at least one content item based in part on the third computing device comprises:
determine a network connection of the third computer system;
determine one or more hardware components of the third computer system; and
select the at least one content item, wherein each of the at least one content item has a format that is suitable for the network connection of the third computer system and the one or more hardware components of the third computer system.

42. The media of claim 29, wherein the software is further operable when executed by the one or more first computer systems to:
analyze content items provided by one or more fourth computer system;
predict one or more potentially popular content items among the content items provided by the one or more fourth computer system;
download the one or more potentially popular content items from the one or more fourth computer system; and
cache the one or more potentially popular content items.

* * * * *